(12) United States Patent  (10) Patent No.: US 9,420,200 B2
Ninan et al.  (45) Date of Patent: Aug. 16, 2016

(54) 3D CAMERAS FOR HDR

(71) Applicant: Dolby Laboratories Licensing Corporation, San Francisco, CA (US)

(72) Inventors: Ajit Ninan, San Jose, CA (US); Scott Daly, Kalama, WA (US); Gregory John Ward, Berkeley, CA (US); Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/932,543

(22) Filed: Nov. 4, 2015

(65) Prior Publication Data

US 2016/0057334 A1  Feb. 25, 2016

Related U.S. Application Data

(62) Division of application No. 13/326,273, filed on Dec. 14, 2011, now Pat. No. 9,210,322.

(60) Provisional application No. 61/449,959, filed on Mar. 7, 2011, provisional application No. 61/427,309, filed on Dec. 27, 2010.

(51) Int. Cl.
  *H04N 5/355* (2011.01)
  *H04N 5/235* (2006.01)
  (Continued)

(52) U.S. Cl.
  CPC .......... *H04N 5/2355* (2013.01); *H04N 5/2353* (2013.01); *H04N 5/23232* (2013.01);
  (Continued)

(58) Field of Classification Search
  CPC ..... H04N 1/335; H04N 1/3871; H04N 1/407; H04N 5/23232; H04N 5/2355; H04N 5/2356; G03B 7/00; G06T 5/009; G06T 5/50; G06T 2207/20208; G06T 5/007
  See application file for complete search history.

(56) References Cited

U.S. PATENT DOCUMENTS 5,648,817 A   7/1997 Aoki
7,126,630 B1  10/2006 Lee
(Continued)

FOREIGN PATENT DOCUMENTS

JP  8102970     4/1996
KR  10-0680256  2/2007
(Continued)

OTHER PUBLICATIONS

Zhu, Jiajun, et al. "Fast omnidirectional 3D scene acquisition with an array of stereo cameras." 3-D Digital Imaging and Modeling, 2007. 3DIM'07. Sixth International Conference on. IEEE, 2007.*

(Continued)

*Primary Examiner* — Sath V Perungavoor
*Assistant Examiner* — Clifford Hilaire

(57) ABSTRACT

High dynamic range 3D images are generated with relatively narrow dynamic range image sensors. Input frames of different views may be set to different exposure settings. Pixels in the input frames may be normalized to a common range of luminance levels. Disparity between normalized pixels in the input frames may be computed and interpolated. The pixels in the different input frames may be shifted to, or stay in, a common reference frame. The pre-normalized luminance levels of the pixels may be used to create high dynamic range pixels that make up one, two or more output frames of different views. Further, a modulated synopter with electronic mirrors is combined with a stereoscopic camera to capture monoscopic HDR, alternating monoscopic HDR and stereoscopic LDR images, or stereoscopic HDR images.

48 Claims, 9 Drawing Sheets

(51) Int. Cl.
   *H04N 5/232*   (2006.01)
   *H04N 13/00*   (2006.01)
   *H04N 13/02*   (2006.01)

(52) U.S. Cl.
   CPC ....... *H04N5/35536* (2013.01); *H04N 13/0007* (2013.01); *H04N 13/0239* (2013.01); *H04N 13/0289* (2013.01); *H04N 13/0029* (2013.01); *H04N 2013/0088* (2013.01)

(56) References Cited

U.S. PATENT DOCUMENTS

| | | | |
|---|---|---|---|
| 7,239,805 | B2 | 7/2007 | Uyttendaele |
| 7,561,731 | B2 | 7/2009 | Wallace |
| 7,616,256 | B2 | 11/2009 | Ward |
| 7,782,393 | B2 | 8/2010 | Ward |
| 9,210,322 | B2 | 12/2015 | Ninan et al. |
| 2002/0012459 | A1* | 1/2002 | Oh .................. G06K 9/32 382/154 |
| 2004/0239798 | A1 | 12/2004 | Nayar |
| 2004/0240725 | A1* | 12/2004 | Xu .................. G06K 9/32 382/154 |
| 2006/0221209 | A1 | 10/2006 | McGuire |
| 2007/0159640 | A1 | 7/2007 | Berestov |
| 2009/0102939 | A1 | 4/2009 | Ahuja |
| 2009/0102946 | A1 | 4/2009 | Tischer |
| 2009/0154787 | A1 | 6/2009 | Bertram |
| 2009/0303315 | A1 | 12/2009 | Charlesworth |
| 2010/0002295 | A1 | 1/2010 | Kimpe |
| 2010/0128108 | A1 | 5/2010 | Song |
| 2010/0183071 | A1 | 7/2010 | Segall |
| 2010/0201783 | A1 | 8/2010 | Ueda |
| 2010/0245546 | A1 | 9/2010 | Kuroki |
| 2010/0303444 | A1 | 12/2010 | Sasaki |
| 2010/0328780 | A1 | 12/2010 | Tocci |
| 2012/0162366 | A1 | 6/2012 | Ninan et al. |

FOREIGN PATENT DOCUMENTS

| | | |
|---|---|---|
| WO | 2008139351 | 11/2008 |
| WO | 2010000230 | 1/2010 |
| WO | 2009/151903 | 3/2010 |

OTHER PUBLICATIONS

Troccoli, Alejandro, Sing Bing Kang, and Steve Seitz. "Multi-view multi-exposure stereo." 3D Data Processing, Visualization, and Transmission, Third International Symposium on. IEEE, 2006.*

Lin, Huei-Yung, and Wei-Zhe Chang. "High dynamic range imaging for stereoscopic scene representation." ICIP. 2009.*

Sun, Jian, Nan-Ning Zheng, and Heung-Yeung Shum. "Stereo matching using belief propagation." Pattern Analysis and Machine Intelligence, IEEE Transactions on 25.7 (2003): 787-800.*

Boogaard, "Exploring Hdr Video—The Real Future of 3D Video" osted on Oct. 22, 2010 in Video Production Video Technology.

Gunnewiek, et al., "Coherent Spatial and Temporal Occlusion Generation" SPIE-IS&T/vol. 7237, Oct. 2009.

Huhle, et al., "Why HDR is Important for 3DTV Model Acquisition" 2008 IEEE, 3DTV-CON, May 28-30, 2008, Istanbul, Turkey pp. 45-48.

Lin, et al., "High Dynamic Range Imaging for Stereoscopic Scene Representation" 2009 IEEE, pp. 4305-4308.

Ramachandra, et al., "HDR Imaging from Differently Exposed Multiview Videos" 2008 IEEE, 3DTV-CON May 28-30, 2008, Istanbul Turkey, pp. 85-88.

Troccoli, et al., "Multi-view Multi-Exposure Stereo" Proceedings of the Third International Symposium on 3D Data Processing, Visualization, and Transmission, 2006 IEEE.

Sun, Jian, et al "Stereo Matching Using Belief Propagation" IEEE Transactions on Pattern Analysis and Machine Intelligence, Jul. 2003, pp. 787-800, vol. 25, No. 7.

Room, Leo, "Visual Summation of Luminance Lines and Illusory Contours Induced by Pictorial, Motion, and Disparity Cues", Vision Research 2001, pp. 3805-3816.

Debevec, Paul E. et al "Recovering High Dynamic Range Radiance Maps from Photographs" ACM Siggraph, 2008.

United States Patent and Trademark Office, U.S. Appl. No. 13/326,273, Non-Final Office Action dated Apr. 20, 2015.

United States Patent and Trademark Office, U.S. Appl. No. 13/326,273, Notice of Allowance dated Sep. 30, 2015.

* cited by examiner

US 9,420,200 B2

3D CAMERAS FOR HDR

CROSS REFERENCE TO RELATED APPLICATIONS

This application is a divisional application of U.S. patent application Ser. No. 13/326,273, filed on Dec. 14, 2011, which claimed the benefit of priority to U.S. Provisional Patent Applications Ser. No. 61/427,309, filed on Dec. 27, 2010, and 61/449,959 filed on Mar. 7, 2011, all of which are hereby incorporated by reference in their entirety.

TECHNOLOGY

The present invention relates generally to image processing systems. More particularly, an embodiment of the present invention relates to image processing systems that process three-dimensional (3D) images from a standard stereoscopic camera to generate 2D or 3D High Dynamic Range (HDR) images.

BACKGROUND

Real world scenes may exceed contrast ratios of as much as 1,000,000:1 between the brightest highlights and the darkest shadows. Many existing image acquisition devices such as built-in cameras on wireless handsets are only capable of reproducing contrast ratios of at most a few hundreds to one. Thus, many existing cameras are not capable of taking advantage of the fact that display systems may now be capable of supporting high dynamic range ("HDR") image formats and permitting rendering images of contrast ratios of a few thousands to one or better.

Many existing cameras do not support HDR because of the high costs associated with HDR image acquisition under existing approaches. For example, image sensors that are capable of producing discerning responses to a wide range of luminance levels are expensive to manufacture. Even if deployed at a high cost, a large volume of image data that would be generated, requiring expensive processing power to process the image data responsively. The shortcomings as discussed above would become more pronounced in stereoscopic cameras as image sensors and data volumes would be doubled in these cameras. As a result, for small footprint devices such as wireless handsets, it would be neither economically feasible nor technically viable to support HDR image acquisition, much less to support 3D HDR image acquisition.

Recently, we have seen low-end cameras, such as the Fujifilm FinePix Real 3D W3 10 Mpixel digital camera, that allow capturing stereoscopic images. Consumer camcorders capable of capturing 3D are now available, such as the Panasonic HDC-SDT750. Furthermore, manufacturers have introduced professional 3D broadcast video cameras, such as the Panasonic AG-3DA1. It is the purpose of this invention to disclose new methods that allow using such cameras to capture 2D or 3D HDR pictures with minimal additional processing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

Example embodiments of the present invention are illustrated by way of example, and not by way of limitation, in the figures of the accompanying drawings and in which like reference numerals refer to similar elements and in which.

DESCRIPTION OF EXAMPLE EMBODIMENTS

Figure 1A:
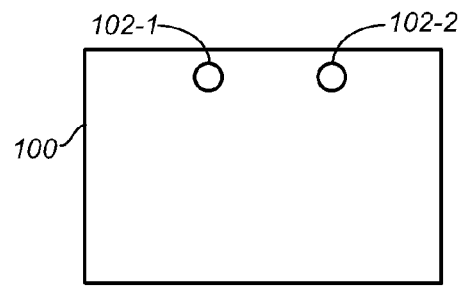
FIG. 1A and FIG. 1B illustrate example stereoscopic image processing systems, according to example embodiments of the present invention.

Example embodiments, which relate to high dynamic range 2D or 3D image processing, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. IMAGE PROCESSING SYSTEMS
3. INPUT FRAMES
4. IMAGE PROCESSING FUNCTIONALITY
5. EXAMPLE PROCESS FLOWS
6. HDR CAPTURE USING A MODULATED SYNOPTER
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiments in a condensed and simplified format, and should be understood as merely a conceptual prelude to a more detailed description of example embodiments that follows below.

Under techniques described herein, a stereoscopic camera that comprises at least two camera elements may set different exposure settings for individual camera elements. For example, a left view camera element in a stereoscopic camera may be set to a first exposure setting for capturing relatively bright portions of a scene, while a right view camera element in the stereoscopic camera may be set to a second exposure setting for capturing relatively dim portions of the same scene. Under the techniques herein, even though input frames generated by the camera elements may be of the same scene, one camera element, the left view camera element in the present example, may be able to capture image details in bright areas of the scene, while another camera element, the right view camera element in the present example, may be able to capture image details in dim areas of the scene.

In an example embodiment, pixels in different input frames may be normalized to a common range of luminance levels. Using the normalized pixels in the input frames, disparity or (spatial) difference between the pixels in one input frame, for example, the left input frame generated by the left view camera element, and the pixels in another input frame, for example, the right input frame generated by the right view camera element may be computed and extended by interpolation to all corresponding pixels in the frames, as will be further explained. The disparity between the pixels in one input frame and the pixels in another input frame may be used to shift pixels from the different input frames to a common reference frame.

In the common reference frame, which may be the left input frame, the right input frame, the centered input frame, or another frame with a different view, the pixels with their pre-normalized luminance levels from the different input frames may be used to generate high dynamic range pixels. The luminance levels, chromas, and hues of the pixels in the common reference frame, combined with disparity and/or depth—here the depth may be determined using the disparity and/or the geometric configuration of the camera elements—may be used to generate output pixels in one or more output frames with different views. As a result, one or more high dynamic range stereoscopic and/or monoscopic images may be created based on at least two input frames with different views and different exposure settings.

In an example embodiment, the steps of (1) computing disparity between the left input frame and the right input frame, (2) extrapolating disparity to overexposed and underexposed pixels, and (3) shifting the left input frame and the right input frame to a common view may be skipped. In an example embodiment, other steps such as normalizing luminance levels of pixels in the input frames or flagging pixels in the input frames for underexposure or overexposure may also be skipped. For example, when the camera elements that generate the left input frame and the right input frame are close to each other, the same portion of a scene as capture by the left input frame and the right input frame may differ only by a small number of pixels in the left input frame and the right input frame. In these example embodiments, an image processing system may combine luminance information recorded in the right input frame into the left input frame. The left input frame incorporating the luminance information from the right input frame may be outputted by the image processing system as a left HDR output frame. Similarly, the image processing system may combine luminance information recorded in the left input frame into the right input frame. The right input frame incorporating the luminance information from the left input frame may be outputted by the image processing system as a right HDR output frame. In an example embodiment, whether to merge input frames directly as described above may be based on a determination of whether the inter-camera distance of the camera elements is below a configurable distance threshold. In an example embodiment, whether to merge input frames directly as described above may be based on a determination involving a different threshold. In an example embodiment, an imaging processing system may be pre-configured to perform direct merging as described above without performing disparity computation and without shifting of the input frames based on the disparity computation.

Under techniques described herein, expensive high dynamic range luminance sensors are not required—but may be used—in a stereoscopic camera in order to generate high dynamic range stereoscopic images. Rather, relatively narrow dynamic range luminance sensors may be used in a system that is capable of outputting relatively wide or high dynamic range frames. In addition, as relative small dynamic range camera elements may be used in a camera system or a computing device herein, the data volumes for input image data may be reduced. Regardless of the dynamic range of the sensor, this technique can be used to extend the sensor's dynamic range.

In some embodiments, mechanisms as described herein form a part of a process system, including but not limited to a television, set-top box, digital video recorder (DVR), a laptop computer, netbook computer, cellular radiotelephone, digital photo frame, electronic book reader, point of sale terminal, desktop computer, computer workstation, computer kiosk, mobile display tablet, and various other kinds of terminals and process units. A composite frame can be generated outside of a process rendering device, such as by a standalone set-top box, and the resulting bitstream transmitted to the process rendering device according to embodiments of present invention Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Image Processing Systems

FIG. 1A illustrates example stereoscopic image processing system 100 in accordance with an example embodiment of the present invention. The example image processing system 100 may comprise two camera elements 102-1 and 102-2. In an example embodiment, the two camera elements (102-1 and 102-2) may be physically or virtually (e.g., through an optical configuration internal to the camera elements) placed on a common reference platform. In an example, the two camera elements (102-1 and 102-2) may be mounted on the same physical platform. In another example, the reference platform may, for example, comprise a geometric relationship of the camera elements (102-1 and 102-2). In the common reference platform, the geometric distance between the camera elements (102-1 and 102-2) may be analogous to an inter-pupil distance of left and right eyes of a human viewer.

The camera elements 102-1 and 102-2 may acquire an original left input frame and an original right input frame, respectively, at the same time to form an original stereoscopic image. As used herein, the original left input frame and the original right input frame are taken at the same time, provided that the time difference for capturing the left and right input frames is within a small tolerance value. In some example embodiments, this small tolerance value may be set differently, and, for example, may be less that one twentieth of a second, one sixtieth of a second, or one hundred twentieth of a second, or a value more or less than the foregoing example values. In an example embodiment, for an image processing system 100 that is capable of capturing pairs of original left and right input frames at a certain rate (for example, in order to produce a 3D video), the small tolerance value may be set as less than the smallest time interval for which two consecutive pairs of original left and right input frames may be captured.

Figure 1B:
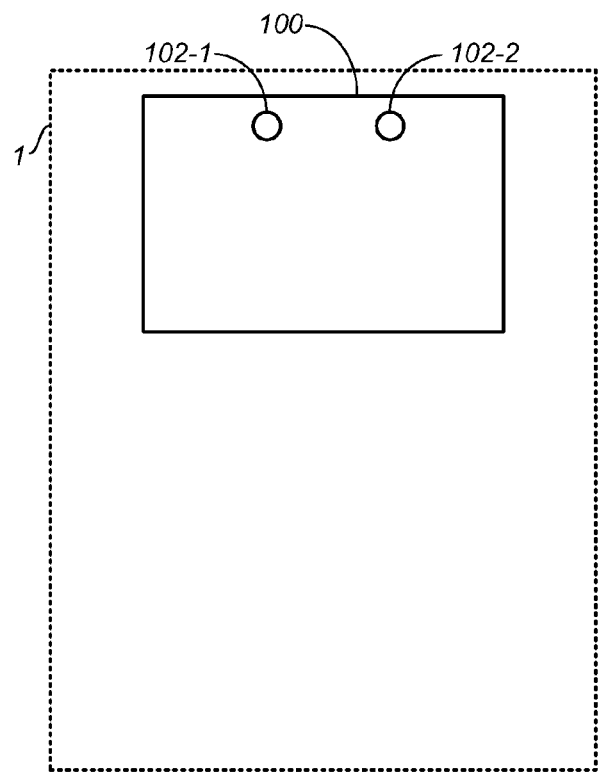

In an example embodiment, an image processing system (e.g., 100) as described herein may be a part of a larger system, as illustrated in FIG. 1B. In various example embodiments, the image processing system 100 may be used in a computing device (e.g., 1); the computing device may be a handset, PDA, notebook computer, etc.

In an example embodiment, the image processing system 100 may be configured to set different exposure settings for different camera elements (102-1 and 102-2). For example, the image processing system 100 may comprise a light measurement sensor to determine an intermediate exposure setting that would be appropriate for both camera elements (102-1 and 102-2) in order to capture a non-HDR 3D image. In an example embodiment, one or both of the camera elements (102-1 and 102-2) may be set to an exposure setting that is different from the intermediate exposure setting determined by the light measurement sensor; this different exposure setting may be a higher exposure setting or a lower exposure setting than the intermediate exposure. In an example embodiment, one (e.g., 102-1) of the camera elements (102-1 and 102-2) may be set to a higher exposure setting, while the other (e.g., 102-2) of the camera elements (102-1 and 102-2) may be set to a lower exposure setting. In an example embodiment, the two exposure settings of the camera elements (102-1 and 102-2) may partially overlap for a certain sub-range of luminance levels, making both camera elements (102-1 and 102-2) differentially responsive to an overlapping range of luminance levels shared between the exposure settings.

In an example embodiment, the brightest level (which may be with a minimum area size) and the darkest level (which may be with the same or a different minimum area size as the brightest level) may be determined from a scene (of which the images are to be captured); one (e.g., 102-1) of the camera elements (102-1 and 102-2) may adjust its exposure setting towards the brightest level (e.g., with an upper limit set at 100%, 75%, 50%, etc. of the brightest level), while the other (e.g., 102-2) of the camera elements (102-1 and 102-2) may adjust its exposure setting towards the darkest level (e.g., with a lower limit set at 100%, 125%, 150%, etc. of the lowest level). These and other variations, including combinations thereof, of setting different exposure settings for the camera elements (102-1 and 102-2) may be used in example embodiments of the present invention.

As used herein, different exposure settings may be realized by setting different mechanical filters, time, gain/sensitivity on the cells or apertures, shutter speeds, aperture sizes, etc. to one or more particular values. Once an exposure setting for a camera element is set, the camera element may be differentially responsive to a particular range of luminance levels corresponding to the exposure setting. Accordingly, an input (image) frame such as an original (left or right) input frame as described herein may be created by the camera element with the exposure setting. As used herein, the phrase "a camera elements being differentially responsive to a range of luminance levels" may mean that, for a luminance level within the range of luminance levels, the camera element is capable of creating a corresponding value indicating the luminance level.

3. Input Frames and Scanlines

Figure 2A:
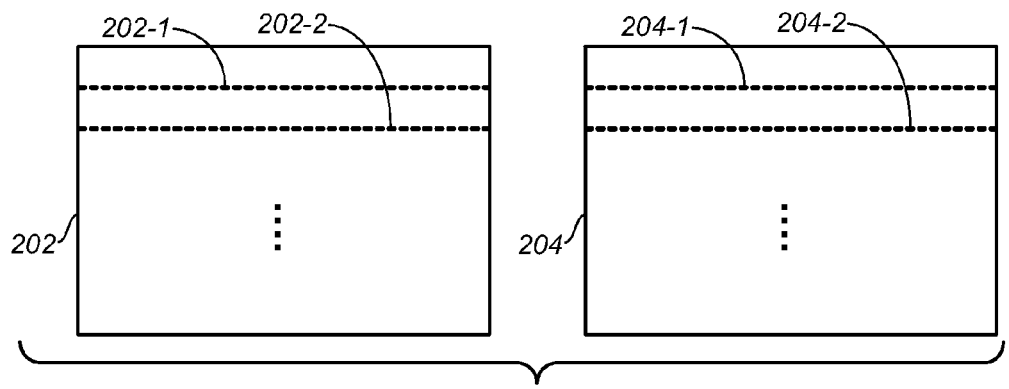
FIG. 2A and FIG. 2B illustrate example input frames, according to possible embodiments of the present invention.

FIG. 2A illustrates an example left input frame 202 and an example right input frame 204. In an example embodiment, the left input frame 202 may be an original left input frame captured by the left camera element (102-1), while the right input frame 204 may be an original right input frame captured by the right camera element (102-2). In an example embodiment, the left input frame 202 may be derived from the original left input frame captured by the left camera element (102-1), while the right input frame 204 may be derived from the original right input frame captured by the right camera element (102-2). For example, the image processing system 100 may comprise one or more image preprocessing modules that generate the left input frame 202 and the right input frame 204 based on the original left and right input frames captured by the left and right camera elements (102-1 and 102-2).

In an example embodiment, an input frame (e.g., one of 202 and 204) may comprise a plurality of input scanlines. In an example embodiment, each input scanline may comprise a set of pixels, which may form one, two, three, four, . . . , sixteen or more lines of pixels. Each of these horizontal lines of pixels may constitute a line of pixels to be rendered on a display panel. In an example embodiment, each input scanline may form one or more blocks of pixels. In various embodiments, a block of pixels may be in any shape, for example, square, rectangle, triangle, circle, etc. In the case of being in a square shape, a block of pixels may comprise pixels in 2×2, 3×3, 4×4, or a different number of pixels. In a particular embodiment, an entire input frame may comprise a single input scanline, two input scanlines, three input scanlines, etc. These and other ways, including combinations thereof, of forming an input scanline may be used in example embodiments of the present invention.

In an example embodiment, each individual left input scanline in a plurality of left input scanlines in the left input frame 202 corresponding to an individual right input scanline in a plurality of right input scanlines in the right input frame 204. As illustrated in FIG. 2A, the plurality of left input scanlines in the left input frame (202) may comprise two left input scanlines (202-1 and 202-2), while the plurality of right input scanlines in the right input frame (204) may comprise two right input scanlines (204-1 and 204-2). The two left input scanlines (202-1 and 202-2) may correspond to the two right input scanlines (204-1 and 204-2), respectively. As used herein, the phrase "a left input scanline (e.g., 202-1) corresponding to a right input scanline (e.g., 204-1)" means that the left input scanline (202-1) and the right input scanline (204-1) relate to the same view if the scene whose stereoscopic image is captured or generated by the left and right camera elements (102-1 and 102-2) in the left input frame (202) and the right input frame (204).

Similarly, a pixel on a left input scanline (e.g., 202-1) may correspond to a pixel on a corresponding right input scanline (e.g., 204-1). As used herein, the phrase "a pixel on a left input scanline (e.g., 202-1) corresponding to a pixel on a corresponding right input scanline (e.g., 204-1)" means that the pixel on the left input scanline (202-1) and the pixel on the right input scanline (204-1) relate to the same view of the scene whose stereoscopic image is captured or generated by the left and right camera elements (102-1 and 102-2) in the left input frame (202) and the right input frame (204).

Figure 2B:
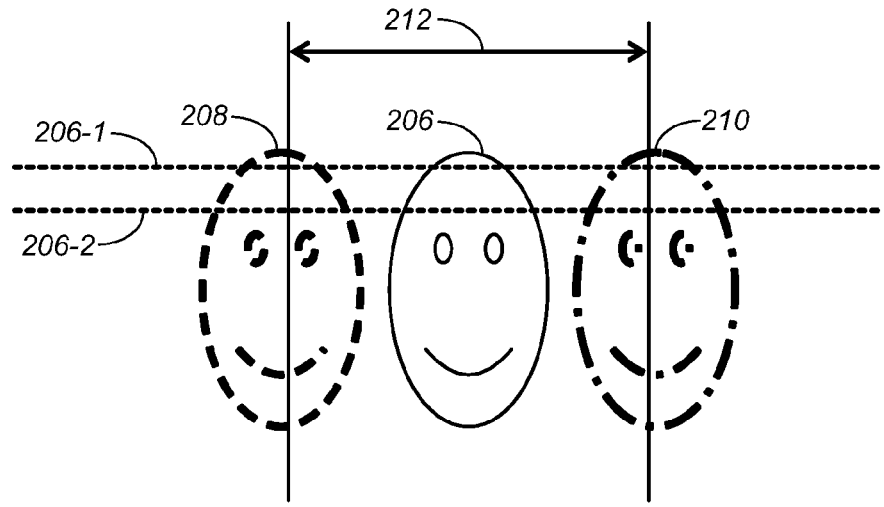

As illustrated in FIG. 2B, the left input frame (202) and the right input frame (204) may form a stereoscopic image of a scene, for example, a scene containing a smiling face 206. The smiling face (206) may be captured in the left input frame (202) by the left camera element (102-1) as a left image portion (208). The same smiling face (206) may be captured in the right input frame (204) by the right camera element (102-2) as a right image portion (210). As illustrated, the left input scanline (202-1) and the right input scanline (204-1) may relate to, or depict, one line (e.g., 206-1) on the smiling face (206), while the left input scanline (202-2) and the right input scanline (204-2) may relate to, or depict, another line (e.g., 206-2) on the smiling face (206). The pixels in these two frames that portray the same view of the scene may not appear in the same geometric locations of the left and right input frames (202 and 204). Rather, as illustrated in FIG. 2B, there may be (spatial) disparity 212 between pixels (e.g., depicting the left image portion 208) in the left input frame and corresponding pixels (e.g., depicting the right image portion 210) in the right input frame.

In an example embodiment, the disparity 212 may be small due to an optical configuration of the camera elements that generate the input frames. For example, the inter-camera distance between the camera elements may be small. In another example, the distance of the object to the camera may be very large relative to the camera's inter-aperture distance. As a result, luminance information from one input frame may be incorporated into the other input frame for purposes of generating an output frame without computing disparity for normally exposed pixels, extrapolating disparity to underexposed or overexposed pixels, and shifting the input frames. In an example embodiment, other steps such as normalizing luminance levels of pixels in the input frames and/or flagging pixels in the input frames for underexposure or overexposure may also be omitted.

4. Image Processing Functionality

Figure 3:
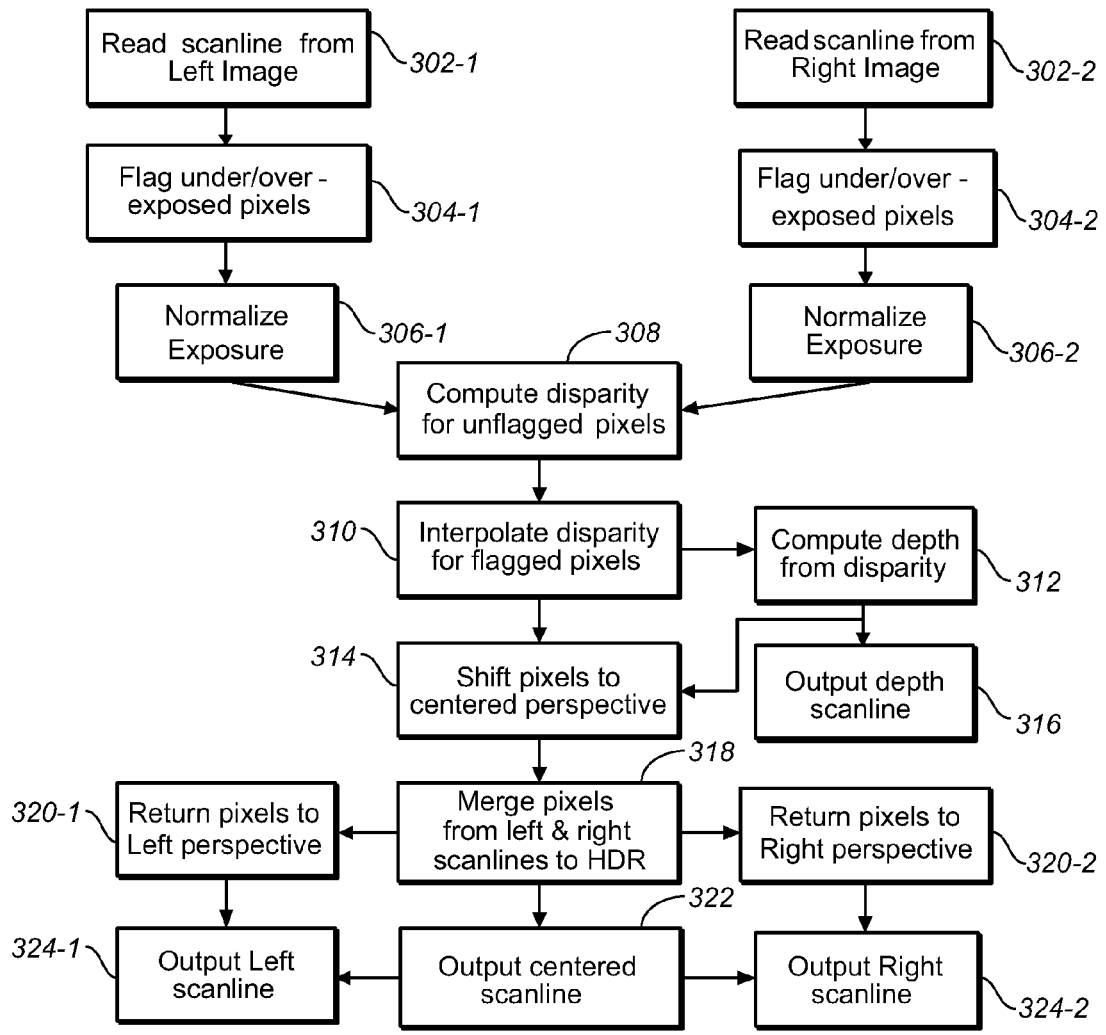
FIG. 3 depicts a block diagram illustrating example functionality of an image processing system, according to possible embodiments of the present invention.

FIG. 3 illustrates a block diagram depicting example functionality that is implemented in accordance with an example embodiment of the present invention. In various embodiments, some, or all, of the functionality depicted may be implemented in an image processing system (e.g., 100) as described herein. In various embodiments, some of the functionality depicted may be omitted in an imaging processing system (e.g., 100) as described herein. For example, components that perform disparity computation may be omitted if the image processing system is configured to merge luminance information of an input frame directly into another input frame for purposes of generating HDR output frames.

In an example embodiment, the image processing system (100) may comprise software and/or hardware components (e.g., 302-1 and 302-2) configured to read a (left input) scanline from a left input frame that captures a left view image of a scene and read a corresponding (right input) scanline from a right input frame that captures a right view image of the same scene. The image processing system (100) may be configured to determine, based on a scanline in an input frame of one of the left and right views, a corresponding scanline in another input frame of the other of the left and right view. In an example embodiment, a left input scanline may have the same sequence number in the left input frame as its corresponding right input scanline in the right input frame. Thus, in an example embodiment, the image processing system (100) may use the sameness of the sequence number to identify a pair of corresponding left and right input scanlines. In an example embodiment, the reading of a pair of corresponding left and right input scanlines may be performed by software and/or hardware components of the image processing system (100) in parallel, in series, or partly in series and partly in parallel.

In an example embodiment, the image processing system (100) may comprise software and/or hardware components (e.g., 304-1 and 304-2) configured to flag underexposure and overexposure pixels in the left and right input scanlines that have been previously read in based on determinations of individual luminance levels of pixels in these scanlines. The pixels flagged as underexposed or overexposed may be excluded from disparity computation between left input pixels in the left input scanline and their corresponding right input pixels in the right input scanline. In an example embodiment, the pixels with the maximum possible luminance level and the minimum possible luminance level are also excluded. In an example embodiment, pixels with additional levels of luminance near the maximum or minimum possible luminance level may additionally and/or optionally be excluded. For example, the image processing system (100) may, programmatically or with user input, set an upper limit and a lower limit in luminance levels. Any pixels with luminance levels above the upper limit or below the lower limit may be excluded from disparity computation as described herein. In an example embodiment, the underexposure and overexposure flagging of the pixels in the left and right input scanlines may be performed by software and/or hardware components of the image processing system (100) in parallel, in series, or partly in series and partly in parallel.

As a pair of corresponding left and right scanlines in the left and right input frames may describe substantially the same portion of the scene whose images are captured in the left and right input frames, the actual luminance as perceived by theoretically infinitely responsive high-fidelity luminance sensors is the same or very similar, affected only by the viewing angles of the camera elements towards the scene. Also, as the pupil distance of the camera elements may be relatively small, any errors or differences in luminance levels, introduced by differing viewing angles of the camera elements towards the scene, as perceived by theoretically infinitely responsive high-fidelity luminance sensors, may be relatively small.

In an example embodiment, the image processing system (100) may comprise software and/or hardware components (e.g., 306-1 and 306-2) configured to normalize the unflagged pixels in the left and right input scanlines to a common range of luminance levels. Even though the common range of luminance levels may only be a relatively narrow slice of the infinite range of luminance levels of the theoretical luminance sensors mentioned above, it may be reasonably expected that the normalized luminance levels of the unflagged pixels are strongly correlated in their luminance levels. This strong correlation even in the relatively narrow common range of luminance levels may be used to compute disparity between left pixels in the left input scanline and the right pixels in the right input scanline.

In an example embodiment, to determine a normalization factor (e.g., a multiplicative factor) for normalizing luminance levels, the image processing system may be configured to compare an average luminance level (or alternatively and/ or optionally, a medium level) in some of the unflagged left pixels in the left input scanline and another average luminance level (or alternatively and/or optionally, a medium level) in some of the unflagged right in the right input scanline.

In an example embodiment, a small set of sample left and right pixels (e.g., with similar pixel positions on the left and right scanline) may be used to compute a first average luminance level for the left pixels in the small set of sample left and right pixels, and a second average luminance level for the right pixels in the small set of sample left and right pixels. The ratio of the first and second average luminance levels may be used to scale, multiply, divide, or normalize the luminance levels of the left input pixels in the left input scanline with the luminance levels of the right input pixels in the right input scanline. In an example embodiment, the normalizing of luminance levels of the unflagged pixels in the left and right input scanlines may be performed by software and/or hardware components of the image processing system (100) in parallel, in series, or partly in series and partly in parallel. The small set of sample left and right pixels used to compute the averages may be selected from portions of the input scanlines in which no or few underexposure and overexposure pixels exist.

In an example embodiment, the image processing system (100) may comprise software and/or hardware components (e.g., 308) configured to compute disparity for unflagged pixels in the left and right input scanlines. For example, the image processing system (100) may implement a disparity detection algorithm to determine disparity based on photometric properties (luminance, hue, chroma) of the pixels of the unflagged pixes in the left and right input scanlines.

In an example embodiment, the image processing system (100) may comprise software and/or hardware components configured (e.g., 310) to extend the computed disparity for unflagged pixels in the left and right input scanlines to the flagged pixels in the left and right input scanlines. In an example embodiment, the disparity computation of the unflagged pixels and the interpolation/extension of the computed disparity to the flagged pixels may be performed by software and/or hardware components of the image processing system (100) in parallel, in series, or partly in series and partly in parallel.

In an example embodiment, additionally and/or optionally, the image processing system (100) may comprise software and/or hardware components (e.g., 312) configured to compute depth of the pixels in the input scanlines from disparity of the pixels in the input scanlines, as previously determined. In an example embodiment, the image processing system (100) may be configured with, or may be capable of acquiring, geometric configuration (e.g., view angles, pupil distance, etc.) of the camera elements (102-1 and 102-2). The image processing system (100) may determine the depth based on the disparity and the geometric configuration of the camera elements (102-1 and 102-2). In an example embodiment, additionally and/or optionally, the image processing system (100) may comprise software and/or hardware components (e.g., 316) configured to output one or more depth scanlines as a part of, or as an addition to, stereographic videos or images, as metadata. The depth scanlines may be used by a downstream media processing component to construct or render the videos or images with different geometries or views than that of the camera elements in the image processing system (100). In such cases, the depth map (312) may also be used in the step to shift pixels to a centered perspective (314).

In an example embodiment, the image processing system (100) may comprise software and/or hardware components (e.g., 314) configured to shift, based on the disparity, the pixels in an input scanline of a view to a different view. As used herein, the term "shift" refers to logical operations to move positions of individual pixels on a scanline to different positions on the scanline. In an example, the image processing system (100) may shift, based on the disparity, the left input pixels in the left input scanline (e.g., left view) to a right view in which the shifted left input pixels now coincide with right input pixels in the right input scanline a right view. In another example, the image processing system (100) may shift, based on the disparity, the right input pixels in the right input scanline (e.g., right view) to a left view in which the shifted left input pixels now coincide with right input pixels in the right input scanline a right view. In yet another example, the image processing system (100) may shift, based on the disparity, both the right input pixels in the right input scanline (e.g., right view) and the left input pixels in the left input scanline (e.g., left view) to a new view (a center, left, or right view) that is both different from the (non-shifted) left view and the (non-shifted) right view. In the new view, one or more of the shifted left pixels and one or more corresponding shifted right pixels coincide. As used herein, the term "coincide" means that the pixels describing the same portion of an image, once shifted based on the disparity from the (non-shifted) left and right views, are in the same pixel positions of the scanlines.

In an example embodiment, the image processing system (100) may comprise software and/or hardware components (e.g., 318) configured to merge the shifted pixels derived from the left and right input scanlines to form high dynamic range output pixels in the shifted view. In an example, the luminance levels of the pixels may be set using a weight-based method. In an example embodiment, if the luminance levels of input pixels originated from one of the left and right input frame are in the middle of the luminance range of the exposure setting for that input frame, the luminance levels of the input pixels may be given a relatively high weight. Conversely, if the luminance levels of input pixels originated from one of the left and right input frames are in the extreme of the luminance range of the exposure setting for that input frame, the luminance levels of the input pixels may be given a relatively lower weight.

In an example embodiment, the relationship of the exposure settings for the left and right input frames may be used to determine input pixels from which the left and right input frames are given more weight than input pixels of the other of the left and right input frames. For example, in scenarios where the luminance range of the left input frame is lower than the luminance range of the right input frame, if the luminance levels of two coinciding left and right input pixels are both low, the luminance levels of the input pixel from the left input frame may be given more weight than the input pixel from the right input frame. However, if the luminance levels of two coinciding left and right input pixels are both high, the luminance levels of the input pixel from the right input frame may be given more weight than the input pixel from the left input frame.

In an example embodiment, to reduce digital quantization artifacts such as false contours or banding effects, the image processing system (100) may be configured to compute the luminance level of an output pixel based at least in part on luminance levels of neighboring pixels (e.g., adjacent pixels, or adjacent blocks of pixels, or adjacent scanlines, or adjacent frames).

In an example embodiment, one or more functions or tables or algorithms or data structures may be configured in the image processing system (100) in order to look up or determine weights for the left pixels and the right pixels, respectively, for the purpose of merging pixels to output HDR pixels.

In an example embodiment, the shifting and/or merging of input pixels may be performed by software and/or hardware components of the image processing system (100) in parallel, in series, or partly in series and partly in parallel.

In an example embodiment, the image processing system (100) may comprise software and/or hardware components (e.g., 324-1, 322 and 324-2) configured to output the merged HDR pixels to different stereoscopic or monoscopic views. For example, the merged HDR pixels may be outputted as a left output scanline in a left HDR output frame, as a right output scanline in a right HDR output frame, or a centered output scanline in a centered output frame. In an example embodiment, the view of an output scanline in an output frame may or may not be the same as that of the left input frame or the right input frame or the centered frame. In an example embodiment, the left HDR output frame may be of the same view of the left input frame. In these embodiments, the HDR pixels may be returned to the left view of the left input frame (e.g., by software and/or hardware components 320-1 and 320-2). Similarly, in an example embodiment, the right HDR output frame may be of the same view of the right input frame. In these embodiments, the HDR pixels may be returned to the right view of the right input frame.

In an example embodiment, the composing and outputting of output pixels as described herein may be performed by software and/or hardware components of the image processing system (100) in parallel, in series, or partly in series and partly in parallel.

5. Example Process Flows

Figure 4A:
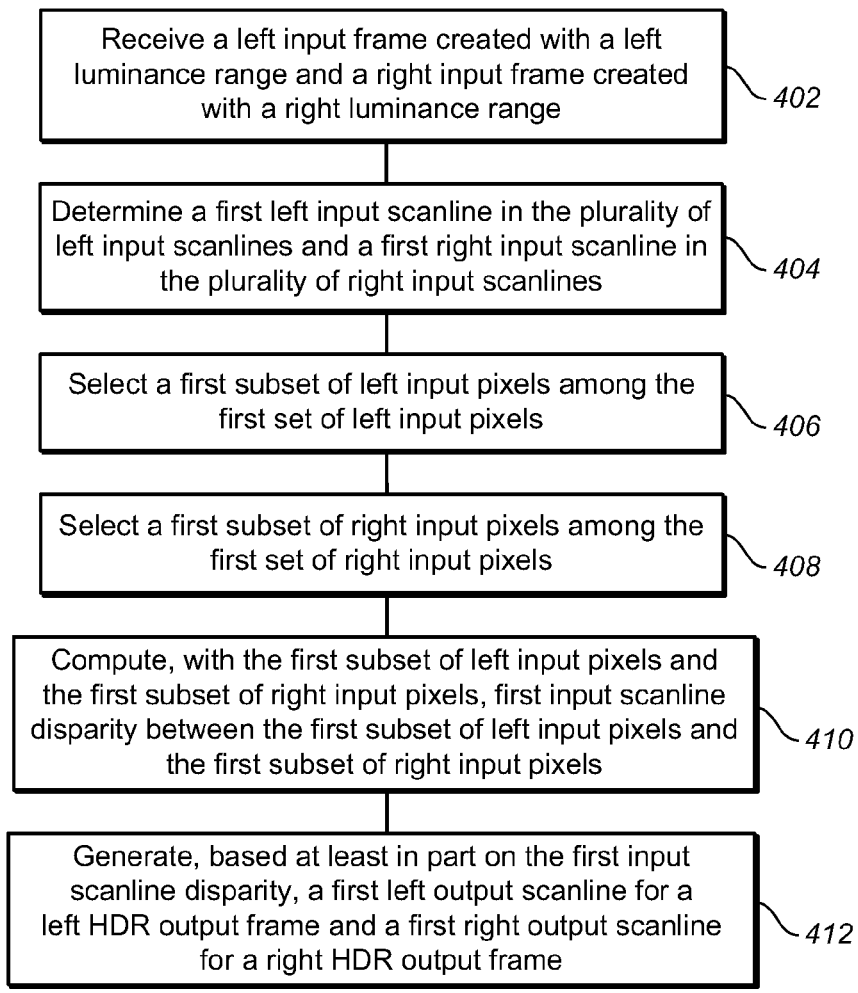
FIG. 4A through FIG. 4D illustrate example process flows, according to a possible embodiment of the present invention.

FIG. 4A illustrates an example process flow according to an example embodiment of the present invention. In an example embodiment, one or more computing devices or components in an image processing system 100, or a computing device that contains an image processing system 100, may perform this process flow. In block 402, the image processing system (100) receives a left input frame created with a left luminance range and a right input frame created with a right luminance range. The left input frame comprises a plurality of left input scanlines, while the right input frame comprises a plurality of right input scanlines. Each individual left input scanline in the plurality of left input scanlines corresponds to an individual right input scanline in the plurality of right input scanlines. In an example embodiment, the left luminance range is different from the right luminance range.

In an example embodiment, the left input frame is derived from an original left image, while the right input frame is derived from an original right image. The original left image and the original right image may be taken at the same time. In an example embodiment, the first left input frame comprises a portion of a left view image on an image plane, while the first right input frame comprises a portion of a right view image on the same image plane. In an example embodiment, the image plane may be that of a stereoscopic camera; the left view image is captured with a left camera element of the stereoscopic camera, while the right view image is captured with a right camera element of the stereoscopic camera. In another example embodiment, the image plane may not be that of a stereoscopic camera; the left view image pertains to a converted left view from an original left view image captured with a left camera element of the stereoscopic camera, while the right view image pertains to a converted right view from an original right view image captured with a right camera element of the stereoscopic camera.

In block 404, the image processing system (100) determines a first left input scanline in the plurality of left input scanlines and a first right input scanline in the plurality of right input scanlines. Here, the first left input scanline corresponds to the first right input scanline. While the first left input scanline comprises a first set of left input pixels, the first right input scanline comprises a first set of right input pixels. In some embodiments, the first left input scanline and the first right input scanline may depict substantially the same portion of the scene captured in the left and right input frames.

In block 406, the image processing system (100) selects a first subset of left input pixels among the first set of left input pixels. In block 408, the image processing system (100) selects a first subset of right input pixels among the first set of right input pixels. In an example embodiment, the first subset of left input pixels may be selected, based on one or more criteria, from the set of left input pixels. In an example, the one or more criteria include an upper luminance level; zero or more pixels, in the set of left input pixels, that are above the upper luminance level are excluded from being included in the first subset of left input pixels. In another example, the one or more criteria include a lower luminance level; zero or more pixels, in the set of left input pixels, that are under the lower luminance level are excluded from being included in the first subset of left input pixels.

In block 410, the image processing system (100) computes, with the first subset of left input pixels and the first subset of right input pixels, first input scanline disparity between the first subset of left input pixels and the first subset of right input pixels. Note that as mentioned earlier, pixels flagged as underexposed or overexposed (304-1 and 304-2) may be excluded from disparity computations (308) and their pixel values may be interpolated (310).

In block 412, the image processing system (100) generates, based at least in part on the first input scanline disparity, a first left output scanline for a left HDR output frame and a first right output scanline for a right HDR output frame.

This process may be repeated for other input scanlines in the left and right input frames. As a result, one or more complete output frames, including the left and right HDR output frames, with one or more views may be generated. The process as described herein may also be repeated for other pairs of left and right input frames.

In an example embodiment, the left HDR output frame and the right HDR output frame as described above comprises a stereoscopic image. The stereoscopic image may, but is not limited to, be one in a time sequence of stereoscopic images that form a video.

In an example embodiment, in response to completing generating all output scanlines for an output frame (e.g., one of the left and right HDR output frames), the image processing system (100) may perform other operations on the output frame such as removing one or more left visual artifacts from the left HDR output frame. For example, some local averaging operations may be performed in one or more portions of the output frame to remove or reduce visible digital dithering effects.

In an example embodiment, to compute the disparity, the image processing system (100) may normalize the first subset of left input pixels with the first subset of right input pixels in reference to a common luminance range. The image processing system (100) may use the first subset of left input pixels as normalized and the second subset of right input pixels as normalized to generate the first input scanline disparity.

In an example embodiment, the image processing system (100) generates by interpolation, based at least in part on the first input scanline disparity, additional input scanline disparity for remaining left pixels in the first set of left input pixels that are not in the first subset of left input pixels and for remaining right pixels in the first set of right input pixels that are not in the first subset of right input pixels.

In an example embodiment, to generate a first left output scanline for a left HDR output frame and a first right output scanline for a right HDR output frame, the image processing system (100) merges the first set of left input pixels and the first set of right input pixels, using pre-normalized luminance levels of the first set of left input pixels and pre-normalized luminance levels of the first set of right input pixels, to form the first left output scanline and the first right output scanline.

In an example embodiment, at least one of the left luminance range and the right luminance range comprises one or more of an aperture setting, a shutter speed setting, or an image luminance sensitivity setting.

In an example embodiment, the image processing system (100) may generate, based at least in part on the first input scanline disparity, an output scanline for an output frame with a view differing from those of the left HDR output frame and the right HDR output frame.

Figure 4B:
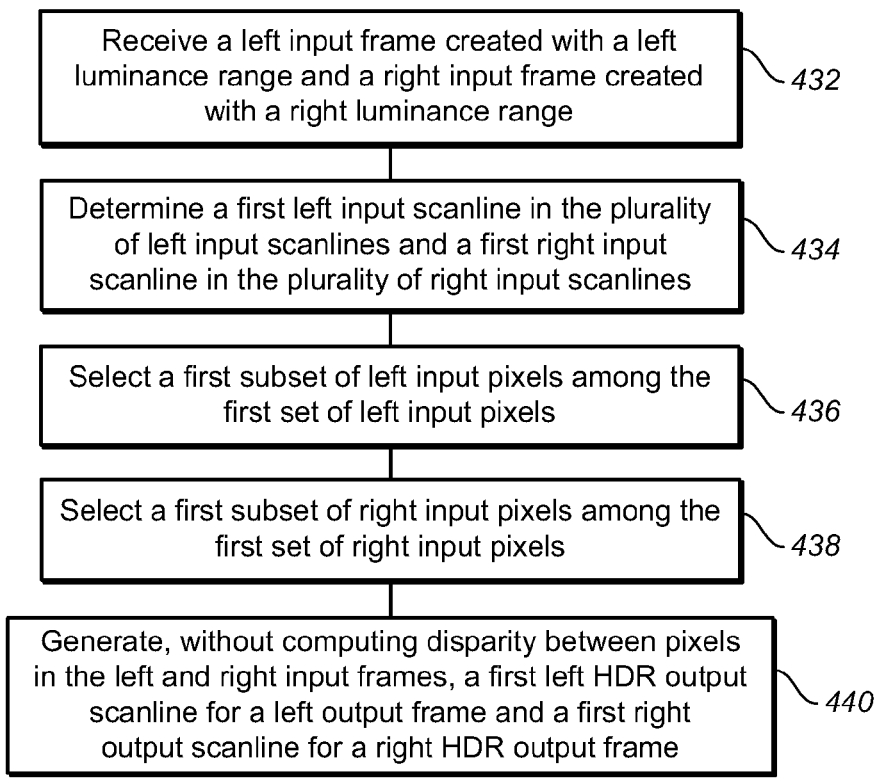

FIG. 4B illustrates an example process flow according to an example embodiment of the present invention where it may not be necessary to compute disparity between the left and right input frames, for example, when the objects are far enough from the camera. In an example embodiment, one or more computing devices or components in an image processing system 100, or a computing device that contains an image processing system 100, may perform this process flow. In block 432, the image processing system (100) receives a left input frame created with a first luminance range and a right input frame created with a second luminance range. The left input frame comprises a plurality of left input scanlines, while the right input frame comprises a plurality of right input scanlines. Each individual left input scanline in the plurality of left input scanlines corresponds to an individual right input scanline in the plurality of right input scanlines. The first luminance range is different from the second luminance range.

In block 434, the image processing system (100) determines a first left input scanline in the plurality of left input scanlines and a first right input scanline in the plurality of right input scanlines. The first left input scanline corresponds to the first right input scanline. The first left input scanline comprises a first set of left input pixels, while the first right input scanline comprises a first set of right input pixels;

In block 436, the image processing system (100) selects a first subset of left input pixels among the first set of left input pixels. In block 438, the image processing system (100) selects a first subset of right input pixels among the first set of right input pixels.

In block 440, the image processing system (100) generates, without computing disparity between pixels in the left input frame and the right input frame, a first left output scanline for a left high dynamic range (HDR) output frame and a first right output scanline for a right HDR output frame.

Figure 4C:
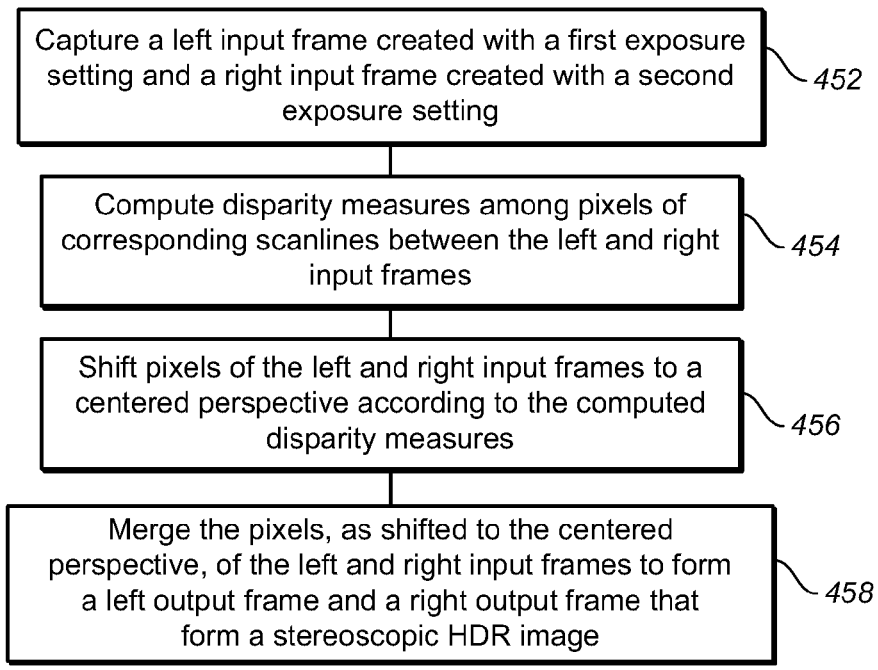

FIG. 4C illustrates an example process flow for creating one or more high dynamic range (HDR) images using a stereoscopic camera according to an example embodiment of the present invention. In an example embodiment, one or more computing devices or components in an image processing system 100, or a computing device that contains an image processing system 100, may perform this process flow. In block 452, the image processing system (100) captures a left input frame created with a first exposure setting and a right input frame created with a second exposure setting. The first exposure setting is different from the second exposure setting. Each of the left input frame and the right input frame may consist of a plurality of scanlines.

In block 454, the image processing system (100) computes disparity measures among pixels of corresponding scanlines between the left and right input frames.

In block 456, the imaging processing system (100) shifts pixels of the left and right input frames to a centered perspective according to the computed disparity measures. These shifts may be guided by the depth map (312). For many types of stereo capture, there are crossed and uncrossed disparities. Crossed disparities are those that result in imagery seen in front of the display screen, and uncrossed disparities are those perceived to be behind the screen. In the case where crossed and uncrossed disparities exist, in order to make a new view (such as a center view), then the shifts are to the left and right depending on the depth for each of the left and right input images.

In block 458, the imaging processing system (100) merges the pixels, as shifted to the centered perspective, of the left and right input frames to form a left HDR output frame and a right HDR output frame that form a stereoscopic HDR image.

In an example embodiment, the imaging processing system (100) may further compute depth measures from the disparity measures, creates, based on the computed depth measures, a depth map for the stereoscopic HDR image, and outputs the stereoscopic HDR image, with depth map as metadata.

In an example embodiment, the imaging processing system (100) may further merge the pixels, as shifted to the centered perspective, of the left and right input frames to form a center output HDR frame, and/or to form one or more output frames with one or more different views than views represented by the center output frame, the left HDR output frame, and the right HDR output frame.

Figure 4D:
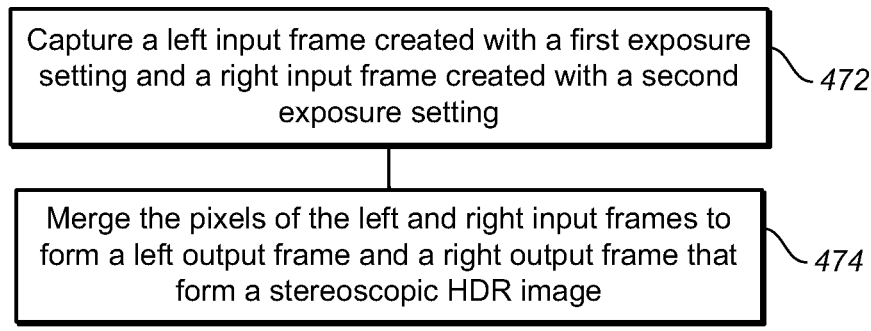

FIG. 4D illustrates an example process flow for creating one or more high dynamic range (HDR) images using a stereoscopic camera according to an example embodiment of the present invention. In an example embodiment, one or more computing devices or components in an image processing system 100, or a computing device that contains an image processing system 100, may perform this process flow. In block 472, the image processing system (100) captures a left input frame created with a first exposure setting and a right input frame created with a second exposure setting. The first exposure setting is different from the second exposure setting. Each of the left input frame and the right input frame may consist of a plurality of scanlines.

In block 474, the image processing system (100) merges the pixels of the left and right input frames to form a left HDR output frame and a right HDR output frame that form a stereoscopic HDR image.

6. HDR Capture Via a Modulated Synopter

A synopter is an optical tool to remove the parallax of different views across the eyes of an observer. Its primary application is for research in isolating various components of depth perception (such as parallax from positional occlusion), although it was invented for viewing of oil paintings. The basic elements of the synopter are shown below in FIG. 5.

The main function of the synopter 500 is to remove the parallax that naturally occurs from the eyes' different viewpoints. In an example embodiment, synopter 500 includes three standard mirrors 510-1, 510-2, and 510-4 (approx. 100% reflectance and 0% transmittance), and a partially transparent mirror 510-3 that can either be a partially-silvered mirror (say, 80% reflectance, 20% transmittance) or an electronic mirror. Partially silvered mirrors can be made with different reflectance/transmittance ratios, but once made, they are fixed. In electronic mirrors, the reflectance and transmittance properties are controlled electronically and dynamically. The widths of the arrows 520-1 and 520-2 reflecting off and transmitting through the electronic mirror 510-3 are to show that relative to the input scene luminance, light amplitude in each optical path has been reduced in each path. Some important elements of the design are that the optical path lengths are the same for each eye, and that the number of reflected surfaces are also the same (the left eye has one extra surface of transmission). Keeping the optical path lengths the same is important in keeping the magnification the same, which prevents localized horizontal and vertical disparities.

The synopter 500 can be used to convert a standard stereographic camera (still or video) into an HDR camera. The main approach in generating HDR imagery is to convert multiple different exposures from a sensor (or across multiple sensors) which has its dynamic range limited by the sensor performance and capture optics (referred to as Standard Dynamic Range, SDR). The sum of the exposures, once converted back to the luminance domain with pixel-to-scene registration, are used to generate the extended, or high, dynamic range image (HDR As described earlier (see FIG. 3), clipped overexposed or underexposed pixels from either of the captured input images may be flagged and not being used in the summation process to better preserve the shadows and highlights of the captured scene. While the sensors of a stereo camera are normally used to generate two different views, they can be used to generate two different exposures and create an HDR image.

In an example embodiment, two different exposures are created using a partially-silvered mirror that has the same reflectance and transmittance ratio (1:1, or 50%:50%) and by inserting a neutral density (ND) filter in the path of either the left or right sensor of a stereoscopic camera. A neutral density filter attenuates the transmission of light approximately equivalently for all wavelengths (generally the visible range), thus giving a reduced exposure for the sensor behind the ND. One problem with using an ND filter is that it throws away light, leading to a lower signal to noise ratio (SNR) for the darker image regions.

Figure 5:
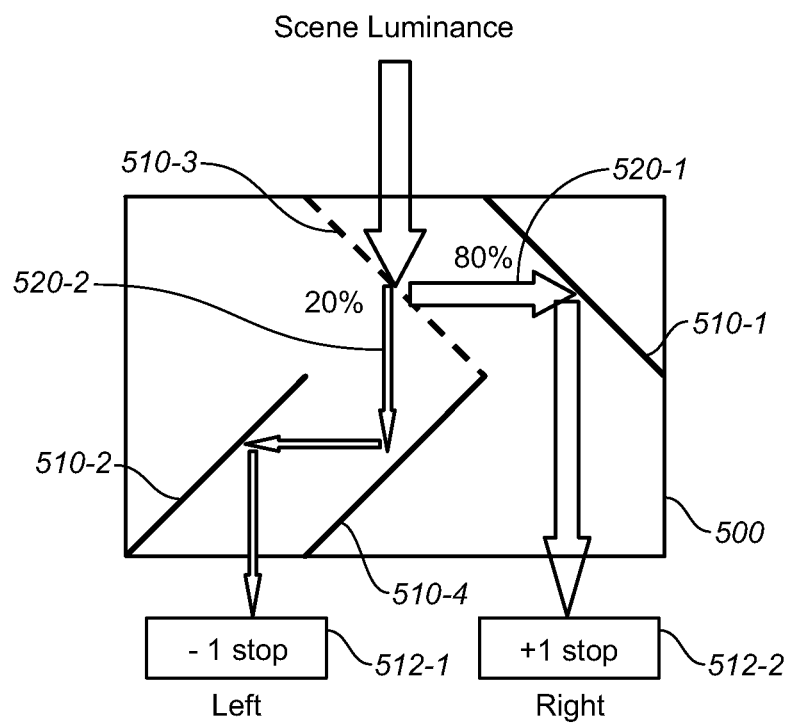
FIG. 5 illustrates an example of capturing an HDR image using a synopter according to possible embodiment of the present invention.

In another example embodiment, which is depicted in FIG. 5, one can create the different exposures by using a partially silvered mirror 510-3 that has unequal reflectance and transmittance ratios. For example, to create a 2-stop difference between the exposures of the two sensors, one can use a 80%:20% ratio for the mirror. Further improvement is to use a relatively recent invention, an electronic mirror, where the reflectance/transmittance properties are controlled electronically, and dynamically. The synopter is used to remove the parallax that normally occurs with a stereographic camera. In an example embodiment, shown in FIG. 5, the synopter 500 may be used as a front-end attachment to a stereographic camera, having two sensors (512-1 and 512-2), generally spaced at the distance between two human eyes. The camera's lenses are not shown, but in a preferred embodiment they would be in between the synopter 500 and the sensors (512-1 and 512-2). An alternate approach would be to design the synopter in the camera behind the lenses.

Figure 6A:
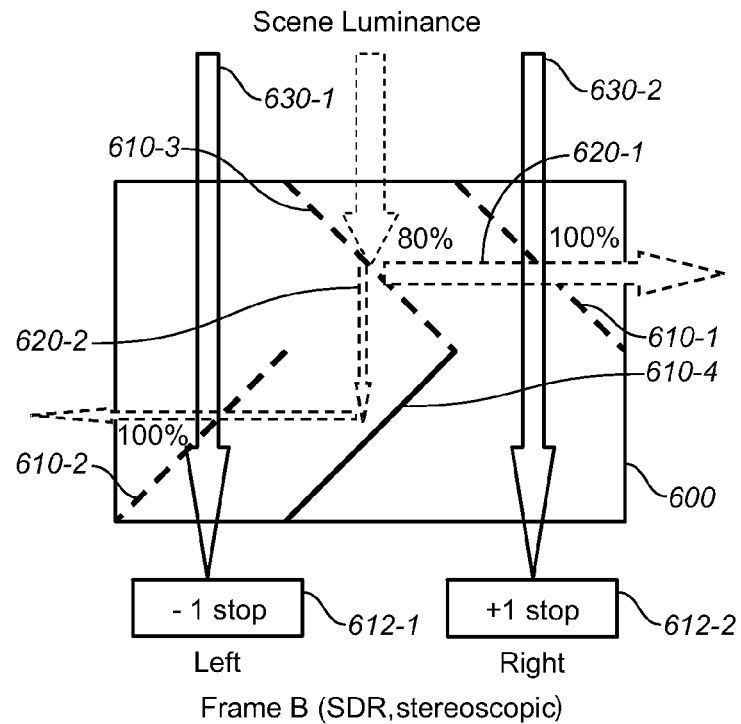
FIG. 6A and FIG. 6B illustrate example image capture modes according to possible embodiment of the present invention.
Figure 6B:
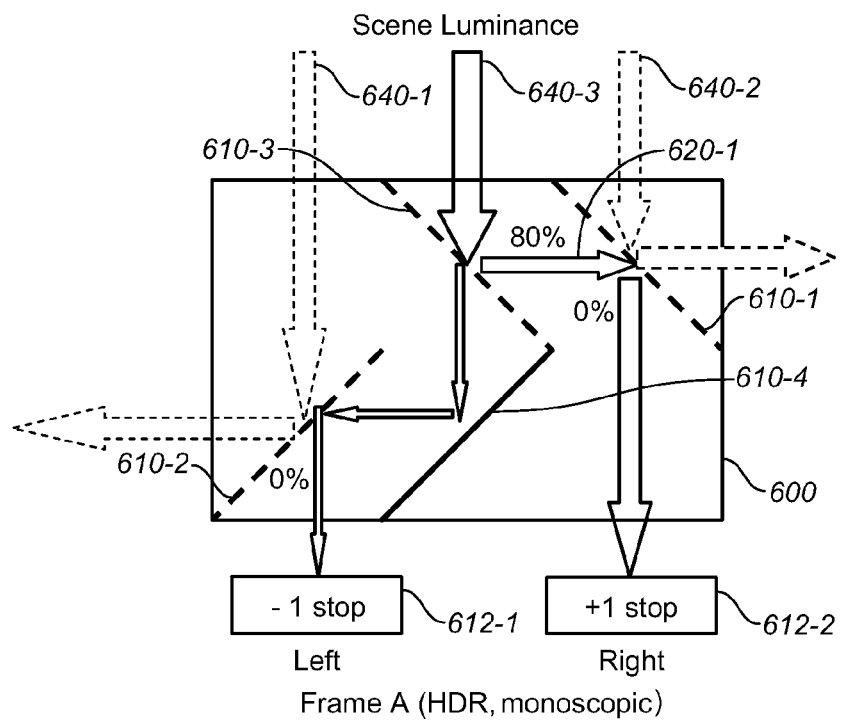

In another example embodiment of this invention shown in FIGS. 6A and 6B, one can allow capturing both HDR and 3D content in the same imagery. This is done by replacing some of the fixed mirrors (510-1 and 510-2) with electronic mirrors (610-1 and 610-2). These new mirrors can be mainly used in a binary switching mode (100% transmitting or 0% transmitting), to allow for faster switching times. The switching states go between standard stereographic capture pairs and multiple exposure pairs. The switching is done at frame rates high enough to prevent temporal artifacts. For example, the mirrors can be switching between full transmitting and full reflective modes at rates at least twice as fast as the desired output frame rate. An example of such embodiment is shown in FIGS. 6A and 6B, where percentage (%) numbers refer to mirror transmittance.

In an example embodiment, the captured frame sequence using image capture system 600 would be ABAB . . . where the A frames capture an HDR pair and the B frames capture the stereographic pair. FIG. 6A shows an example embodiment of the stereographic image capture mode while FIG. 6B shows a possible embodiment of the HDR image capture mode. For video, the states can be oscillated at a frame rate, which is sufficiently high that flickering artifacts are not visible. The flickering artifacts are rendered inperceptible because the temporal response of the HVS disparity-correspondence matching neural circuitry has a low temporal bandwidth so the stereographic disparity signal can be generated at a lower frame rate than the overall video rate. In FIGS. 6A and 6B, the 80/20% mirror 610-3 can be either electronic (which may be beneficial in some circumstances), or a fixed, partial-silvered mirror.

In FIG. 6A, in stereographic image capture mode, mirrors 610 are set in 100% transmissive mode and there is no HDR capture. The light transmitted through mirrors 610-1 and 610-2 should be shunted into optical baffles to prevent scatter into the stereographic optical paths 630-1 and 630-2.

FIG. 6B shows the mirrors 610-1 and 610-2 switched to 100% reflective mode (0% transmissive) to allow for the HDR capture. Arrow 640-3 shows the HDR light path, and arrows 640-1 and 640-2 show the stereographic light paths which should be shunted outside of the capture optical path into absorption baffles.

Figure 7:
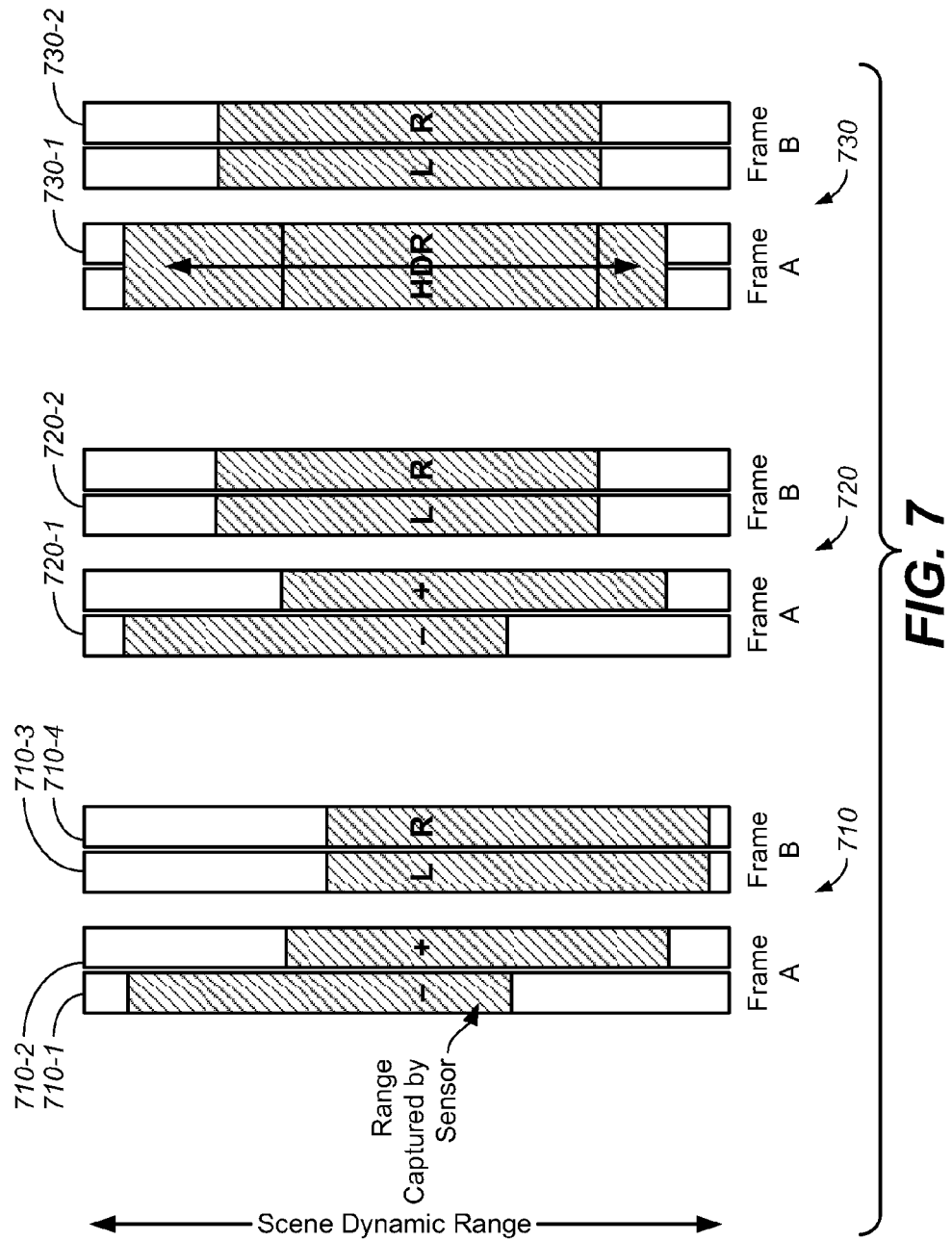
FIG. 7 illustrates exposure ranges of imagery captured according to example embodiments of the present invention.

The resulting exposure ranges for the different sensors and switched states (i.e., frames A, B) are shown in FIG. 7, where the luminance of the scene is shown on a log-luminance axis. In each frame, the full scene range is shown as the white rectangle, and the captured portion of the range is shown shaded. In the leftmost diagram 710, the exposures are shown according to the FIGS. 6A and 6B. The underexposed (−) image 710-1 from Frame A maintains information in the bright end of the scene, but losing details in the dark. The overexposed (+) image 710-2 loses details in the bright end, but keeps details in the dark end. The stereographic images 710-3 and 710-4 are exposed even more than the HDR pair, so they capture even less of the highlights, and more of the shadow detail. They also have the same dynamic range, which is a preferred embodiment.

The middle diagram 720 shows a gain adjustment of the stereographic pair in Frame B (720-2) to place it within the range of the HDR capture pair in Frame A (720-1). This is not necessary, but is a preferred embodiment that facilitates the merging algorithms described below.

The diagram 730 on the right shows the merging of the two pictures in Frame A into a single HDR image, which has a larger luminance range than the stereographic pair. The two images of frame A (720-1) can be combined to single view using any of the methods discussed in earlier sections; however, since the synopter effectively removes the parallax between these two images, one could skip steps required to compute and eliminate the disparity among pixels of corresponding scan lines between the left and right A frames.

6.1 Generating a Stereoscopic HDR Image

In an example embodiment of the present invention one may want to create a new stereoscopic HDR image using information from both the monoscopic HDR image (730-1) and a standard dynamic range, but stereoscopic, image frame B (730-2). An embodiment based on such a method is described next, below.

Given a pair of stereoscopic SDR images, say from a stereoscopic frame B 720-2, a recommended first main step is the generation of a new center viewpoint 730-2. As discussed earlier, this step may incorporate such key sub-steps as:

Disparity shifting
Occlusion region filling, and
Image edge refinement

While any view can be generated, a center view is generated so that it can be matched to the HDR image 730-1. In addition, the stereoscopic pair 720-2 may also be used to create a depth map 820 by matching pixels across the left and right pair and calculating horizontal disparities and using known optical magnification of the scene to the camera sensor.

Figure 8:
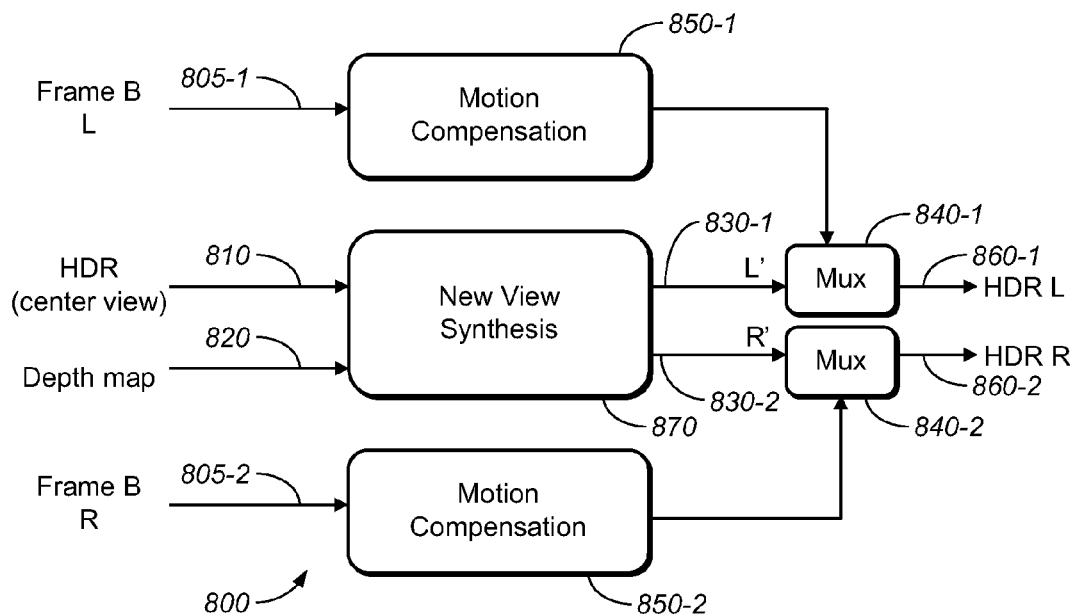
FIG. 8 illustrates a block diagram of a processing system for generating stereoscopic HDR images according to example embodiments of the present invention.

FIG. 8 shows an example embodiment, wherein a stereoscopic HDR 860 image is created using a monoscopic HDR image 810 (e.g., approximately the same as 730-1), a stereoscopic SDR image 805 (710-3 and 710-4), and a corresponding depth map 820. Block "new view synthesis" system 870 uses the depth map 820 and the HDR center image 810 to generate two new images, referred to in FIG. 8 as L' 830-1 and R' 830-2, corresponding to the viewpoints of the left and right stereographic pair (805). The input of positional data for the Left and Right optical centers is not shown in the diagram, but is a calibration step. These L' and R' images (830) could be used directly for viewing, but new view synthesis 870 is subject to various errors, such as artifacts due to occlusion region mismatches across the eyes, so it is better to use optically captured left and right data (805) as much as possible, and use the HDR view (810) only for the extended range regions. This process is shown as the multiplexer steps 840-1 and 840-2, and various methods can be used, such as weighted addition, switching at the SDR range limits, or various combinations, such as range dependent blending. The stereographic frames are captured at a different instant in time; thus motion compensation 850-1 and 850-2 may also be used to time align the input stereographic pair to the HDR input.

An alternate embodiment has the motion compensation step in the HDR path and remove it from the optically captured (Frame B left and right) paths.

The final output 860 is stereographic image pair, both having matching high dynamic range and robustness across the frames.

For still image capture, frames A and B would be taken in rapid succession and integrated via the algorithms described. A two-frame motion compensation algorithm could still be used.

Other variations such as modulating the electronic mirror with different ratios across frames for all positions are used in some example embodiments.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
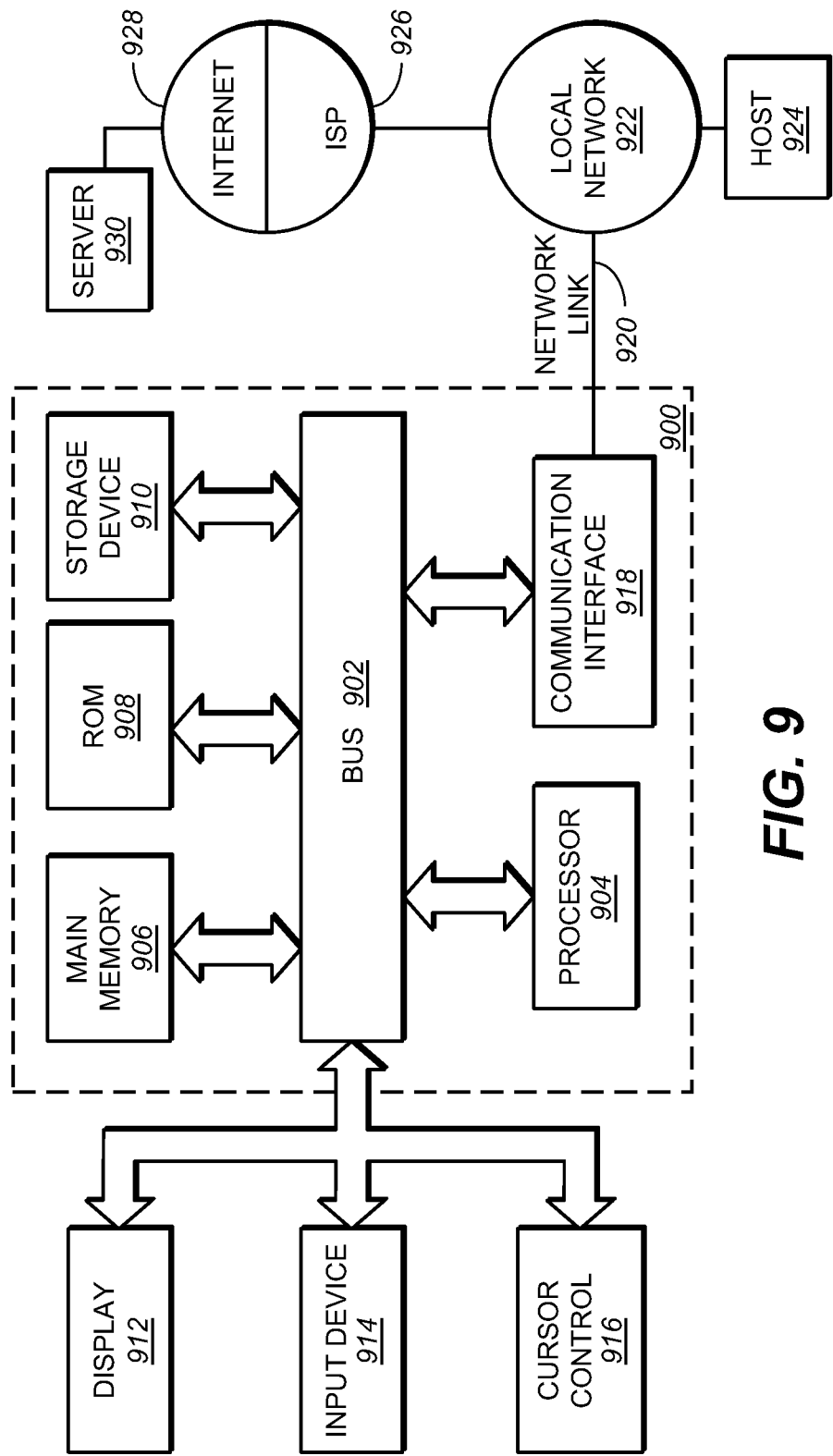
FIG. 9 illustrates an example hardware platform on which a computer or a computing device as described herein may be implemented, according to an example embodiment of the present invention.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. Equivalents, Extensions, Alternatives and Miscellaneous

To illustrate a clear example, an image processing system illustrated in FIG. 1A and FIG. 1B comprises camera elements to acquire left and right input frames. It should be noted that this is for illustration purposes only. In other embodiments, the camera elements may be implemented in an external image acquisition system outside the image processing system described herein. Image data such as input frames illustrated in FIG. 2A and FIG. 2B may be provided by the external system to the image processing system described herein. The external system may be operatively linked to the image processing system.

Figure 10:
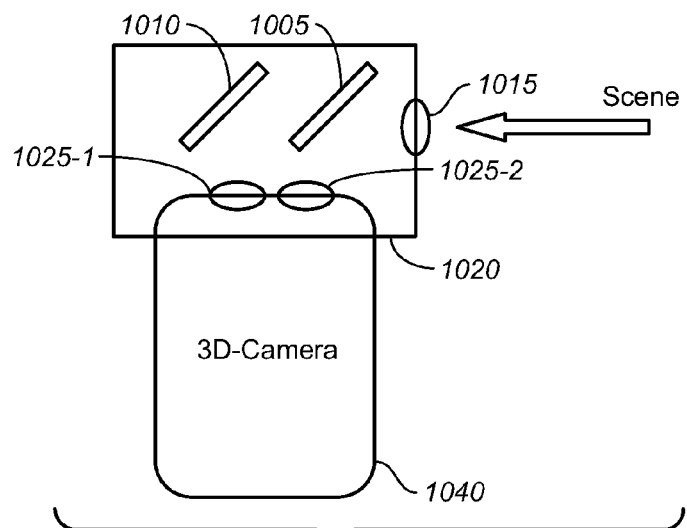
FIG. 10 illustrates an alternative HDR camera system according to example embodiments of the present invention.

Unlike a synopter designed to work with a human face, there are fewer constraints for one designed to work with a camera. For example, the camera could be oriented at 90 degrees to the scene, as shown in FIG. 10, and a different lens can be used for R and L viewpoints to correct for focal length differences. FIG. 10 shows an embodiment that includes a traditional 3D camera 1040 with left and right lenses 1025 and a front-end unit 1020 that includes a lens 1015, a "splitter" 1005, and a mirror with integrated ND filter 1010. As in previous embodiments, the "splitter" 1005 could be an electrically controlled partially silvered mirror, which would allow the selection of ND difference. The "Mirror" 1010 does not necessarily need to have an ND built into it if the silvered mirror is not exactly 50%. This design has the advantage of both L and R views going through the same primary lens element 1015, reducing cost and increasing correspondence between views. The configuration shown in FIG. 10 would not generate a 3D image without removing the front-end unit 1020, but could be used for HDR capture.

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a left input frame created with a first luminance range and a right input frame created with a second luminance range, the left input frame comprising a plurality of left input scanlines, the right input frame comprising a plurality of right input scanlines, each individual left input scanline in the plurality of left input scanlines corresponding to an individual right input scanline in the plurality of right input scanlines, and the first luminance range being different from the second luminance range;

determining a first left input scanline in the plurality of left input scanlines and a first right input scanline in the plurality of right input scanlines, the first left input scanline corresponding to the first right input scanline, the first left input scanline comprising a first set of left input pixels, and the first right input scanline comprising a first set of right input pixels;

selecting a first subset of left input pixels among the first set of left input pixels;

selecting a first subset of right input pixels among the first set of right input pixels;

computing, with the first subset of left input pixels and the first subset of right input pixels, first input scanline disparity between the first subset of left input pixels and the first subset of right input pixels;

generating, based at least in part on the first input scanline disparity, a first left output scanline for a left high dynamic range (HDR) output frame and a first right output scanline for a right HDR output frame;

wherein the first subset of left input pixels is selected, based on one or more criteria, from the set of left input pixels;

wherein the one or more criteria comprise an upper luminance level and wherein zero or more pixels, in the set of left input pixels, that are above the upper luminance level are excluded from being included in the first subset of left input pixels.

2. The method of claim 1, further comprising:
normalizing the first subset of left input pixels with the first subset of right input pixels to a common luminance range;
using the first subset of left input pixels as normalized and the second subset of right input pixels as normalized to generate the first input scanline disparity.

3. The method of claim 1, further comprising generating by interpolation, based at least in part on the first input scanline disparity, additional input scanline disparity for remaining left pixels in the first set of left input pixels that are not in the first subset of left input pixels and for remaining right pixels in the first set of right input pixels that are not in the first subset of right input pixels.

4. The method of claim 1, wherein generating, based at least in part on the first input scanline disparity, a first left output scanline for a left HDR output frame and a first right output scanline for a right HDR output frame includes merging the first set of left input pixels and the first set of right input pixels, using pre-normalized luminance levels of the first set of left input pixels and pre-normalized luminance levels of the first set of right input pixels, to form the first left output scanline and the first right output scanline based at least in part on the first input scanline disparity.

5. The method of claim 1, wherein the first left input frame comprises a portion of a left view image on an image plane, and wherein the first right input frame comprises a portion of a right view image on the same image plane.

6. The method of claim 5, wherein the image plane is that of a stereoscopic camera, wherein the left view image is captured with a left camera element of the stereoscopic camera, and wherein the right view image is captured with a right camera element of the stereoscopic camera.

7. The method of claim 5, wherein the image plane is not that of a stereoscopic camera, wherein the left view image pertains to a converted left view from an original left view image captured with a left camera element of the stereoscopic camera, and wherein the right view image pertains to a converted right view from an original right view image captured with a right camera element of the stereoscopic camera.

8. The method of claim 1, wherein at least one of the first luminance range and the second luminance range comprises one or more of an aperture setting, a shutter speed setting, or an image luminance sensitivity setting.

9. The method of claim 1, wherein the left input frame is derived from an original left image, wherein the right input frame is derived from an original right image, and wherein the original left image and the original right image are taken at the same time.

10. The method of claim 1, wherein the left HDR output frame and the right HDR output frame comprises a stereoscopic image.

11. The method of claim 10, wherein the stereoscopic image is one in a time sequence of stereoscopic images that form a video.

12. The method of claim 1, further comprising generating, based at least in part on the first input scanline disparity, an output scanline for an output frame with a view differing from those of the left HDR output frame and the right HDR output frame.

13. The method of claim 1, further comprising:
determining a second left input scanline in the plurality of left input scanlines and a second right input scanline in the plurality of right input scanlines, the second input scanline corresponding to the second right input scanline, the second left input scanline comprising a second set of left input pixels, and the second right input scanline comprising a second set of right input pixels;
selecting a second subset of left input pixels among the second set of left input pixels;
selecting a second subset of right input pixels among the second set of right input pixels;
computing, with the second subset of left input pixels and the second subset of right input pixels, second input scanline disparity between the second subset of left input pixels and the second subset of right input pixels;
generating, based at least in part on the second input scanline disparity, a second left output scanline for the left HDR output frame and a second right output scanline for the right HDR output frame.

14. The method of claim 13, further comprising:
in response to completing generating all left output scanlines for the left HDR output frame, removing one or more left visual artifacts from the left HDR output frame;
in response to completing generating all right output scanlines for the right HDR output frame, removing one or more right visual artifacts from the right HDR output frame.

15. A method comprising:
receiving a left input frame created with a first luminance range and a right input frame created with a second luminance range, the left input frame comprising a plurality of left input scanlines, the right input frame comprising a plurality of right input scanlines, each individual left input scanline in the plurality of left input scanlines corresponding to an individual right input scanline in the plurality of right input scanlines, and the first luminance range being different from the second luminance range;

determining a first left input scanline in the plurality of left input scanlines and a first right input scanline in the plurality of right input scanlines, the first left input scanline corresponding to the first right input scanline, the first left input scanline comprising a first set of left input pixels, and the first right input scanline comprising a first set of right input pixels;

selecting a first subset of left input pixels among the first set of left input pixels;

selecting a first subset of right input pixels among the first set of right input pixels;

generating, without computing disparity between pixels in the left input frame and the right input frame, a first left output scanline for a left high dynamic range (HDR) output frame and a first right output scanline for a right HDR output frame;

wherein the first subset of left input pixels is selected, based on one or more criteria, from the set of left input pixels;

wherein the one or more criteria comprise an upper luminance level and wherein zero or more pixels, in the set of left input pixels, that are above the upper luminance level are excluded from being included in the first subset of left input pixels.

16. The method of claim 15, wherein the first left input frame comprises a portion of a left view image on an image plane, and wherein the first right input frame comprises a portion of a right view image on the same image plane.

17. The method of claim 16, wherein the image plane is that of a stereoscopic camera, wherein the left view image is captured with a left camera element of the stereoscopic camera, and wherein the right view image is captured with a right camera element of the stereoscopic camera.

18. The method of claim 16, wherein the image plane is not that of a stereoscopic camera, wherein the left view image pertains to a converted left view from an original left view image captured with a left camera element of the stereoscopic camera, and wherein the right view image pertains to a converted right view from an original right view image captured with a right camera element of the stereoscopic camera.

19. The method of claim 15, wherein at least one of the first luminance range and the second luminance range comprises one or more of an aperture setting, a shutter speed setting, or an image luminance sensitivity setting.

20. The method of claim 15, wherein the left input frame is derived from an original left image, wherein the right input frame is derived from an original right image, and wherein the original left image and the original right image are taken at the same time.

21. The method of claim 15, wherein the left HDR output frame and the right HDR output frame comprises a stereoscopic image.

22. The method of claim 21, wherein the stereoscopic image is one in a time sequence of stereoscopic images that form a video.

23. The method of claim 15, further comprising:
determining a second left input scanline in the plurality of left input scanlines and a second right input scanline in the plurality of right input scanlines, the second input scanline corresponding to the second right input scanline, the second left input scanline comprising a second set of left input pixels, and the second right input scanline comprising a second set of right input pixels;

selecting a second subset of left input pixels among the second set of left input pixels;

selecting a second subset of right input pixels among the second set of right input pixels;

generating, without computing disparity, a second left output scanline for the left HDR output frame and a second right output scanline for the right HDR output frame.

24. The method of claim 23, further comprising:
in response to completing generating all left output scanlines for the left HDR output frame, removing one or more left visual artifacts from the left HDR output frame;

in response to completing generating all right output scanlines for the right HDR output frame, removing one or more right visual artifacts from the right HDR output frame.

25. A method comprising:
receiving a left input frame created with a first luminance range and a right input frame created with a second luminance range, the left input frame comprising a plurality of left input scanlines, the right input frame comprising a plurality of right input scanlines, each individual left input scanline in the plurality of left input scanlines corresponding to an individual right input scanline in the plurality of right input scanlines, and the first luminance range being different from the second luminance range;

determining a first left input scanline in the plurality of left input scanlines and a first right input scanline in the plurality of right input scanlines, the first left input scanline corresponding to the first right input scanline, the first left input scanline comprising a first set of left input pixels, and the first right input scanline comprising a first set of right input pixels;

selecting a first subset of left input pixels among the first set of left input pixels;

selecting a first subset of right input pixels among the first set of right input pixels;

computing, with the first subset of left input pixels and the first subset of right input pixels, first input scanline disparity between the first subset of left input pixels and the first subset of right input pixels;

generating, based at least in part on the first input scanline disparity, a first left output scanline for a left high dynamic range (HDR) output frame and a first right output scanline for a right HDR output frame;

wherein the first subset of left input pixels is selected, based on one or more criteria, from the set of left input pixels;

wherein the one or more criteria comprise a lower luminance level and wherein zero or more pixels, in the set of left input pixels, that are under the lower luminance level are excluded from the first subset of left input pixels.

26. The method of claim 25, further comprising:
normalizing the first subset of left input pixels with the first subset of right input pixels to a common luminance range;

using the first subset of left input pixels as normalized and the second subset of right input pixels as normalized to generate the first input scanline disparity.

27. The method of claim 25, further comprising generating by interpolation, based at least in part on the first input scanline disparity, additional input scanline disparity for remaining left pixels in the first set of left input pixels that are not in the first subset of left input pixels and for remaining right pixels in the first set of right input pixels that are not in the first subset of right input pixels.

28. The method of claim 25, wherein generating, based at least in part on the first input scanline disparity, a first left output scanline for a left HDR output frame and a first right output scanline for a right HDR output frame includes merging the first set of left input pixels and the first set of right input pixels, using pre-normalized luminance levels of the first set of left input pixels and pre-normalized luminance levels of the first set of right input pixels, to form the first left output scanline and the first right output scanline based at least in part on the first input scanline disparity.

29. The method of claim 25, wherein the first left input frame comprises a portion of a left view image on an image plane, and wherein the first right input frame comprises a portion of a right view image on the same image plane.

30. The method of claim 29, wherein the image plane is that of a stereoscopic camera, wherein the left view image is captured with a left camera element of the stereoscopic camera, and wherein the right view image is captured with a right camera element of the stereoscopic camera.

31. The method of claim 29, wherein the image plane is not that of a stereoscopic camera, wherein the left view image pertains to a converted left view from an original left view image captured with a left camera element of the stereoscopic camera, and wherein the right view image pertains to a converted right view from an original right view image captured with a right camera element of the stereoscopic camera.

32. The method of claim 25, wherein at least one of the first luminance range and the second luminance range comprises one or more of an aperture setting, a shutter speed setting, or an image luminance sensitivity setting.

33. The method of claim 25, wherein the left input frame is derived from an original left image, wherein the right input frame is derived from an original right image, and wherein the original left image and the original right image are taken at the same time.

34. The method of claim 25, wherein the left HDR output frame and the right HDR output frame comprises a stereoscopic image.

35. The method of claim 25, wherein the stereoscopic image is one in a time sequence of stereoscopic images that form a video.

36. The method of claim 25, further comprising generating, based at least in part on the first input scanline disparity, an output scanline for an output frame with a view differing from those of the left HDR output frame and the right HDR output frame.

37. The method of claim 25, further comprising:
determining a second left input scanline in the plurality of left input scanlines and a second right input scanline in the plurality of right input scanlines, the second input scanline corresponding to the second right input scanline, the second left input scanline comprising a second set of left input pixels, and the second right input scanline comprising a second set of right input pixels;
selecting a second subset of left input pixels among the second set of left input pixels;
selecting a second subset of right input pixels among the second set of right input pixels;
computing, with the second subset of left input pixels and the second subset of right input pixels, second input scanline disparity between the second subset of left input pixels and the second subset of right input pixels;
generating, based at least in part on the second input scanline disparity, a second left output scanline for the left HDR output frame and a second right output scanline for the right HDR output frame.

38. The method of claim 37, further comprising:
in response to completing generating all left output scanlines for the left HDR output frame, removing one or more left visual artifacts from the left HDR output frame;
in response to completing generating all right output scanlines for the right HDR output frame, removing one or more right visual artifacts from the right HDR output frame.

39. A method comprising:
receiving a left input frame created with a first luminance range and a right input frame created with a second luminance range, the left input frame comprising a plurality of left input scanlines, the right input frame comprising a plurality of right input scanlines, each individual left input scanline in the plurality of left input scanlines corresponding to an individual right input scanline in the plurality of right input scanlines, and the first luminance range being different from the second luminance range;
determining a first left input scanline in the plurality of left input scanlines and a first right input scanline in the plurality of right input scanlines, the first left input scanline corresponding to the first right input scanline, the first left input scanline comprising a first set of left input pixels, and the first right input scanline comprising a first set of right input pixels;
selecting a first subset of left input pixels among the first set of left input pixels;
selecting a first subset of right input pixels among the first set of right input pixels;
generating, without computing disparity between pixels in the left input frame and the right input frame, a first left output scanline for a left high dynamic range (HDR) output frame and a first right output scanline for a right HDR output frame;
wherein the first subset of left input pixels is selected, based on one or more criteria, from the set of left input pixels;
wherein the one or more criteria comprise an upper luminance level and wherein zero or more pixels, in the set of left input pixels, that are above the upper luminance level are excluded from being included in the first subset of left input pixels.

40. The method of claim 39, wherein the first left input frame comprises a portion of a left view image on an image plane, and wherein the first right input frame comprises a portion of a right view image on the same image plane.

41. The method of claim 40, wherein the image plane is that of a stereoscopic camera, wherein the left view image is captured with a left camera element of the stereoscopic camera, and wherein the right view image is captured with a right camera element of the stereoscopic camera.

42. The method of claim 40, wherein the image plane is not that of a stereoscopic camera, wherein the left view image pertains to a converted left view from an original left view image captured with a left camera element of the stereoscopic camera, and wherein the right view image pertains to a converted right view from an original right view image captured with a right camera element of the stereoscopic camera.

43. The method of claim 39, wherein at least one of the first luminance range and the second luminance range comprises one or more of an aperture setting, a shutter speed setting, or an image luminance sensitivity setting.

44. The method of claim 39, wherein the left input frame is derived from an original left image, wherein the right input frame is derived from an original right image, and wherein the original left image and the original right image are taken at the same time.

45. The method of claim 39, wherein the left HDR output frame and the right HDR output frame comprises a stereoscopic image.

46. The method of claim 45, wherein the stereoscopic image is one in a time sequence of stereoscopic images that form a video.

47. The method of claim 39, further comprising:
determining a second left input scanline in the plurality of left input scanlines and a second right input scanline in the plurality of right input scanlines, the second input scanline corresponding to the second right input scanline, the second left input scanline comprising a second set of left input pixels, and the second right input scanline comprising a second set of right input pixels;
selecting a second subset of left input pixels among the second set of left input pixels;
selecting a second subset of right input pixels among the second set of right input pixels;
generating, without computing disparity, a second left output scanline for the left HDR output frame and a second right output scanline for the right HDR output frame.

48. The method of claim 47, further comprising:
in response to completing generating all left output scanlines for the left HDR output frame, removing one or more left visual artifacts from the left HDR output frame;
in response to completing generating all right output scanlines for the right HDR output frame, removing one or more right visual artifacts from the right HDR output frame.

* * * * *